(12) United States Patent
Hardacker et al.

(10) Patent No.: US 8,155,598 B2
(45) Date of Patent: Apr. 10, 2012

(54) SYSTEM AND METHOD FOR POWER CONTROL IN MIMO SYSTEMS

(75) Inventors: Robert Hardacker, Escondido, CA (US); James R. Milne, Ramona, CA (US); Robert A. Unger, El Cajon, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 520 days.

(21) Appl. No.: 12/351,701

(22) Filed: Jan. 9, 2009

(65) Prior Publication Data

US 2010/0178883 A1 Jul. 15, 2010

(51) Int. Cl.
*H04B 1/00* (2006.01)
(52) U.S. Cl. .......................................... 455/69; 455/101
(58) Field of Classification Search .................... 455/69, 455/522, 101
See application file for complete search history.

(56) References Cited

U.S. PATENT DOCUMENTS

| 6,903,867 B2 | 6/2005 | Ng et al. |
| 2005/0245280 A1 | 11/2005 | Liu et al. |
| 2006/0133531 A1 | 6/2006 | Iwasaki |
| 2006/0281422 A1 | 12/2006 | Pan et al. |
| 2008/0227405 A1* | 9/2008 | Harel et al. ..................... 455/69 |
| 2008/0273636 A1 | 11/2008 | Zhu et al. |
| 2009/0149139 A1* | 6/2009 | Harel et al. ................... 455/101 |

FOREIGN PATENT DOCUMENTS

EP 1207645 A1 5/2002

OTHER PUBLICATIONS

International Search Report and Written Opinion, PCT/US2010/000017, dated Aug. 24, 2010.

* cited by examiner

*Primary Examiner* — Tu X Nguyen
(74) *Attorney, Agent, or Firm* — Dickstein Shapiro LLP

(57) ABSTRACT

The return channel in a multiple-input and multiple-output (MIMO) communication system is used to provide signal information on an individual-channel basis. In one embodiment, in a controlled factory environment, this information may be used to incrementing up or down the variable gain amplifier and/or the power amplifier of a MIMO transmitter and/or receiver so as to generate a default signal power offset to be used during normal operation. Thereafter, such signal information may similarly be provided via the return channel and used to further adjust the transmit parameters to account for location-specific signal conditions.

2 Claims, 5 Drawing Sheets

FIG. 1

PRIOR ART

SYSTEM AND METHOD FOR POWER CONTROL IN MIMO SYSTEMS

FIELD OF THE INVENTION

The present invention relates in general to controlling and/or adjusting the transmit power for each channel in a multiple-input and multiple-output (MIMO) communication system.

BACKGROUND

Multiple-input and multiple-output systems, or MIMO systems, rely on the use of multiple antennas on both the transmitter-side as well as the receiver-side. MIMO technology is increasingly being adopted for numerous wireless communication applications since such technology tends to increase data throughput and link range without requiring additional transmit power over non-MIMO configurations. In particular, MIMO systems tend to have higher spectral efficiency, as well as improved link reliability by reducing fading effects.

Figure 1:
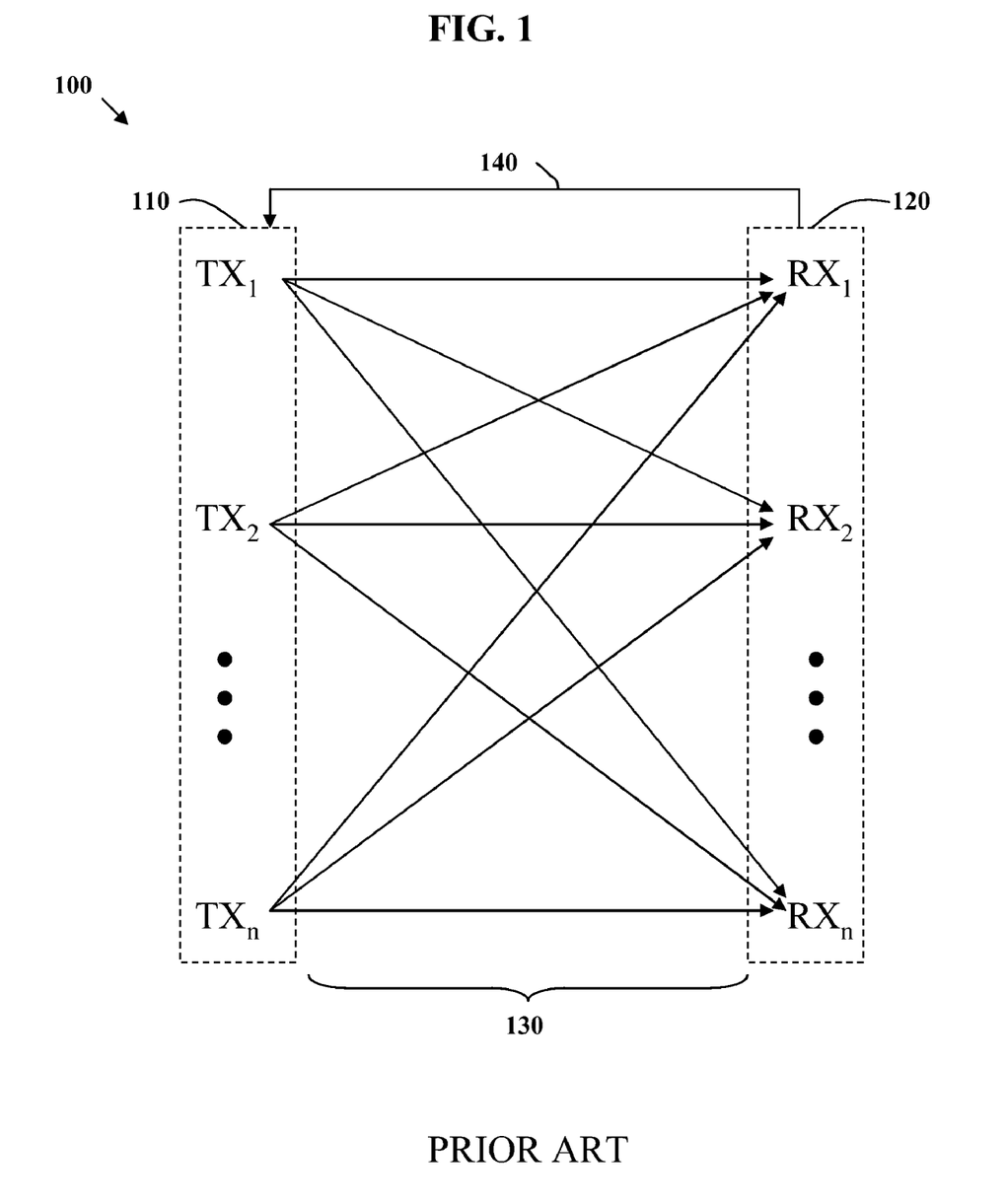
FIG. 1 depicts the transmitter-side and receiver-side of a typical MIMO communication system.

With reference to FIG. 1, in a typical MIMO communication system 100, the transmitter-side 110 is comprised of multiple individual transmitters ($TX_1$-$TX_n$), each having its own antenna and related signal-transmission circuitry (as is generally known in the art). The receiver-side 120 is comprised of multiple receivers ($RX_1$-$RX_n$) each also having its own antenna and related signal-receiving circuitry (as is generally known in the art). The MIMO communication system 100 is based on the concept of sending multiple communication streams using the multiple transmit antennas on the transmitter-side 110. These communication streams pass through a channel matrix 130, which is comprised of multiple communications paths extending between the various transmit antennas on the transmitter-side 110 and corresponding receive antennas on the receiver-side 120. The MIMO communication system 100 also includes a return channel 140, which is used to provide feedback to the transmitter-side. Such examples of feedback include: authentication, reception quality and coordinating a frequency jump to a new channel.

Each of the transmitters ($TX_1$-$TX_n$) typically has its own power amplifier (PA) and variable gain amplifier (VGA), while each receiver ($RX_1$-$RX_n$) will have its own VGA. It is not uncommon for one channel to perform better than another, or a certain group of channels to perform better than another group of channels. Ideally, all of the transmitters ($TX_1$-$TX_n$) should be very closely matched in output characteristics. In fact, transmitter channels exceeding certain output tolerances may not satisfy the manufacturer's quality control requirements. As such, what is needed is a method for improving the output characteristics of MIMO transmitters so as to improve system performance and/or reduce manufacturing-related costs.

BRIEF SUMMARY OF THE INVENTION

Disclosed and claimed herein are systems and methods for providing power control in MIMO systems. In one embodiment, a method for providing power control in a MIMO communication system includes measuring a plurality of signal strengths provided by a transmitter-side of the MIMO communication system, wherein the transmitter-side comprises a plurality of individual transmitters. This plurality of signal strengths may then be correlated to corresponding transmitters of the plurality of individual transmitters. The method further includes determining if any of the plurality of signal strengths exceeds a predetermined tolerance, providing feedback regarding the plurality of signal strengths to the transmitter-side via a return channel, and then adjusting a signal power offset for each of the plurality of individual transmitters corresponding to any of the plurality of signal strengths that exceed the predetermined tolerance.

In another embodiment, the aforementioned method may be performed at one of a user location having an uncontrolled environment, and a manufacturing location having a controlled environment. Additionally, the method may comprise a factory calibration process performed by test equipment, or a power control scheme implemented during normal operation. In another embodiment, the method may be implemented on the receiver-side.

Other aspects, features, and techniques of the invention will be apparent to one skilled in the relevant art in view of the following detailed description of the invention.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF EXEMPLARY EMBODIMENTS

Disclosure Overview

One aspect of the disclosure relates to providing feedback in a MIMO communication system regarding signal strength information for each individual channel. In one embodiment, this feedback may be provided via a wired or wireless return channel, and may be performed as a calibration process at the factory and/or during normal operation at a user location. When performed at the factory, such feedback information may be used to establish default or initial signal power offsets. When performed at a user location during normal operation, such feedback may be used to account for location-specific interferences and related signal anomalies specific to the user location. In certain embodiments, this process may be performed on a continuous basis while the MIMO communication system is in normal operation.

In certain embodiments, the above mentioned feedback may be used to control or calibrate the transmit parameters for each of the individual transmitters on the MIMO system's transmitter-side. Separate feedback may similarly be used to control or calibrate parameters for the individual receivers on the MIMO system's receiver-side. In one embodiment, such control may include adjusting the VGA and/or PA offsets of one or more of the MIMO transmitter and/or receivers comprising the MIMO system. These adjustments, or offsets, may be performed by incrementing up or down the PA and/or VGA by a predetermined amount, or alternatively as a function of the amount by which the measured signal strength exceeds some tolerance value.

When this calibration process is performed at the factory level, the number of devices that exceed the manufacturer's quality control requirements for signal output tolerances may be minimized. These resulting or default factory-level offsets may then be stored for use when the MIMO system (i.e., both transmitter-side and receiver-side) is placed into normal operation.

Additionally, system-level gain control measures may be employed for the overall transmitter-side, rather than (or in addition to) on a per-transmitter basis. In certain embodiments, adjusting all signal power gain levels up or down together may provide better system control, easier signal reception and/or easier demuxing of the transmitted streams into the original individual streams.

As used herein, the terms "a" or "an" shall mean one or more than one. The term "plurality" shall mean two or more than two. The term "another" is defined as a second or more. The terms "including" and/or "having" are open ended (e.g., comprising). The term "or" as used herein is to be interpreted as inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

Reference throughout this document to "one embodiment", "certain embodiments", "an embodiment" or similar term means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner on one or more embodiments without limitation.

In accordance with the practices of persons skilled in the art of computer programming, the invention is described below with reference to operations that are performed by a computer system or a like electronic system. Such operations are sometimes referred to as being computer-executed. It will be appreciated that operations that are symbolically represented include the manipulation by a processor, such as a central processing unit, of electrical signals representing data bits and the maintenance of data bits at memory locations, such as in system memory, as well as other processing of signals. The memory locations where data bits are maintained are physical locations that have particular electrical, magnetic, optical, or organic properties corresponding to the data bits.

When implemented in software, the elements of the invention are essentially the code segments to perform the necessary tasks. The code segments can be stored in a processor readable medium or transmitted by a computer data signal. The "processor readable medium" may include any medium that can store or transfer information. Examples of the processor readable medium include an electronic circuit, a semiconductor memory device, a ROM, a flash memory or other non-volatile memory, a floppy diskette, a CD-ROM, an optical disk, a hard disk, a fiber optic medium, a radio frequency (RF) link, etc.

Exemplary Embodiments

Figure 2:
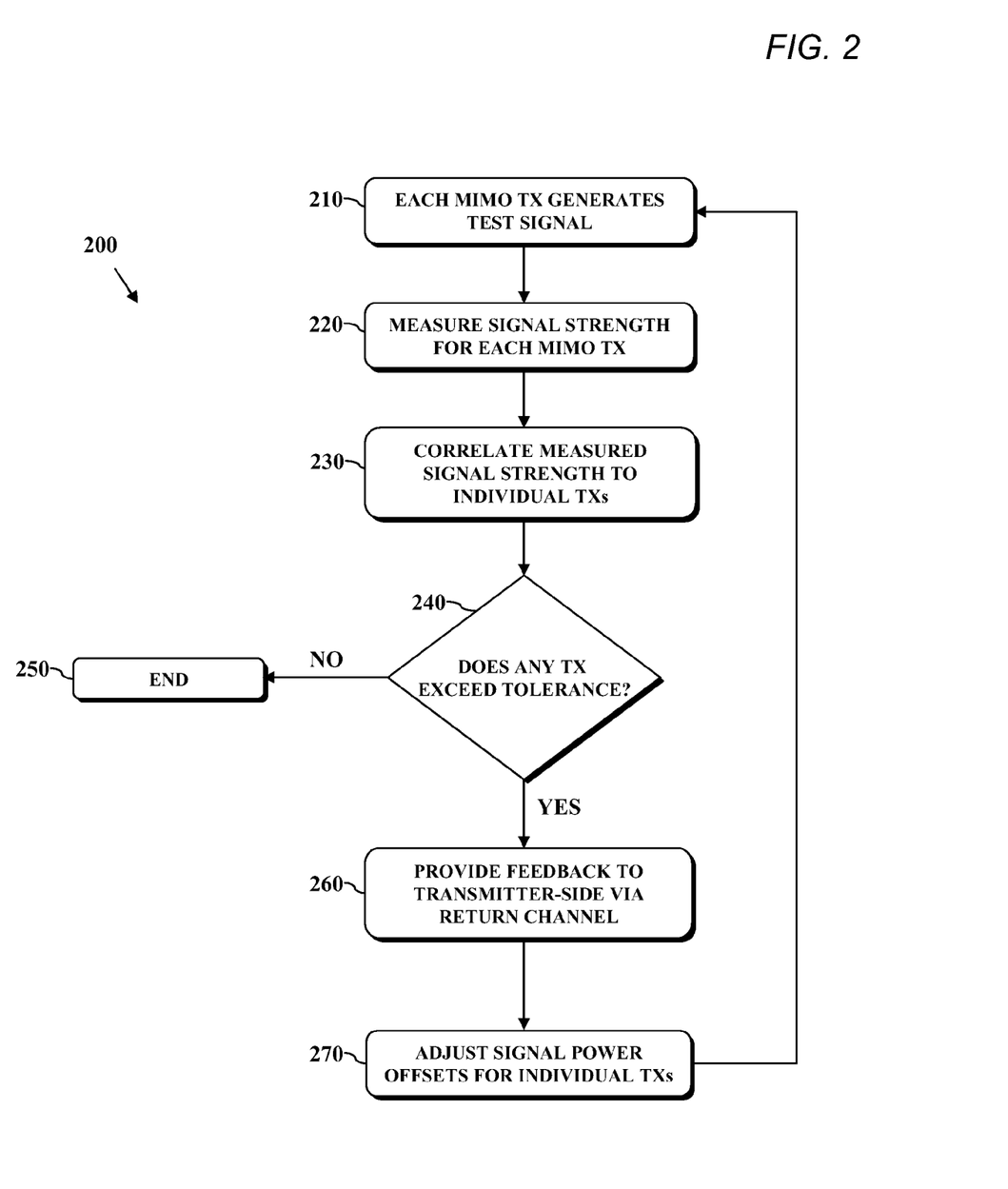
FIG. 2 depicts a process for implementing a MIMO signal calibration process at the factory-level for the transmitter-side, in accordance with one embodiment of the invention.

Referring now to FIG. 2, depicted is one embodiment of a process for implementing a MIMO signal calibration scheme in accordance with the principles of the invention. In one embodiment, process 200 may be implemented as a factory calibration process for the transmitter-side of such a MIMO communication system, such as MIMO communication system 100. In particular, process 200 begins at block 210 where each of the MIMO transmitters (e.g., $TX_1$-$TX_n$) may generate a test signal. These test signals may then be measured at block 220 by dedicated test equipment. In one embodiment, the test signals may be provided to the test equipment via either a wired or wireless channel. When transmitted wirelessly, the test signals may be transmitted in a controlled environment so as to minimize ambient interferences and location-specific signal anomalies. However, the test signals may similarly be provided to the test equipment by each of the individual MIMO transmitters over one or more wired connections. When transmitted over a wired connection, the test signals may be captured at a point after the test signal has been generated, but before reaching the antenna. This signal capturing process may be performed by connecting the test equipment to each of the individual transmitters on the transmitter-side of the unit under test. It should be appreciated that the test equipment may comprise any known equipment capable of receiving a test signal and measuring the signal strength properties thereof (e.g., spectrum analyzer, network analyzer, etc.).

Once the signals have been measured, process 200 may continue to block 230 where the measured signal strengths may be correlated to the individual transmitters that produced them and which comprise the transmitter-side (e.g., transmitter-side 110) of the MIMO system. Alternatively, the individual transmitters may be correlated to their respective signals prior to the measurement operation of block 220.

Process 200 may then continue to block 240 where a determination may be made as to whether any of the individual transmitters on the transmitter-side exhibit a signal strength that is outside a predetermined tolerance (e.g., ±X dB) from the other transmitters. In one embodiment, this tolerance may be set by the manufacturer.

In one embodiment, the determination at block 240 may be made by summing and averaging the signal strengths for all of the transmitters to arrive at a signal average. Then, signal strengths for each of the individual transmitters may be compared to this computed signal average to see if any one of the individual transmitters differs from the computed signal average by more than a predetermined tolerance (e.g., ±X dB). Alternatively, the determination at block 240 may be based on sampling the signal strength at block 220 a number of times for each of the transmitters. These samples may then be compared against standard deviation values for each of the transmitters.

Still another method for making the determination at block 240 is to again sample the signal strength at block 220 a number of times for each of the transmitters. However, instead of directly comparing standard deviation values, the samples for each transmitter may first be summed and averaged, and then the standard deviation amongst all of the transmitters may be used to determine if the predetermined tolerance has been exceeded. It should of course be appreciated that numerous other approaches for determining whether the signal strength for any of the individual transmitters exceeds a predetermined tolerance.

Regardless of how the determination at block 240 is performed, if it is determined that no individual transmitter is exceeding the predetermined tolerance, process 200 will continue to block 250 where the process may end. If, on the other hand, it is determined that any one or more of the transmitters exceed the signal strength tolerance, then process 200 may continue to block 260 where feedback representative of this determination may be provided to the transmitter-side via a return channel. Such feedback may be preferably provided by the test equipment to the transmitter-side via a wired or wireless return channel.

Continuing to refer to FIG. 2, process 200 may then continue to block 270 where the transmit parameters may be adjusted up or down for any individual transmitter that exceeded the tolerance at block 240. In one embodiment, such adjustment may comprise adjusting the power offsets (e.g., VGA and/or PA offsets) of the particular transmitter in question. In one embodiment, such calibration may be performed by incrementing up or down the signal power gain by a predetermined amount. Alternatively, the amount of the calibration may be a function of the amount by which the given transmitter exceeded the predetermined tolerance. The operations of blocks 210-270 may be repeated until the signal strengths for each of the individual transmitters have been normalized (i.e., each exhibit signal strength within tolerance). The final set of resulting signal power offsets (i.e., adjustments to PA and/or VGA) may then be stored by the particular MIMO system and used as the default signal power offset when the MIMO system is placed into normal operation.

Figure 3:
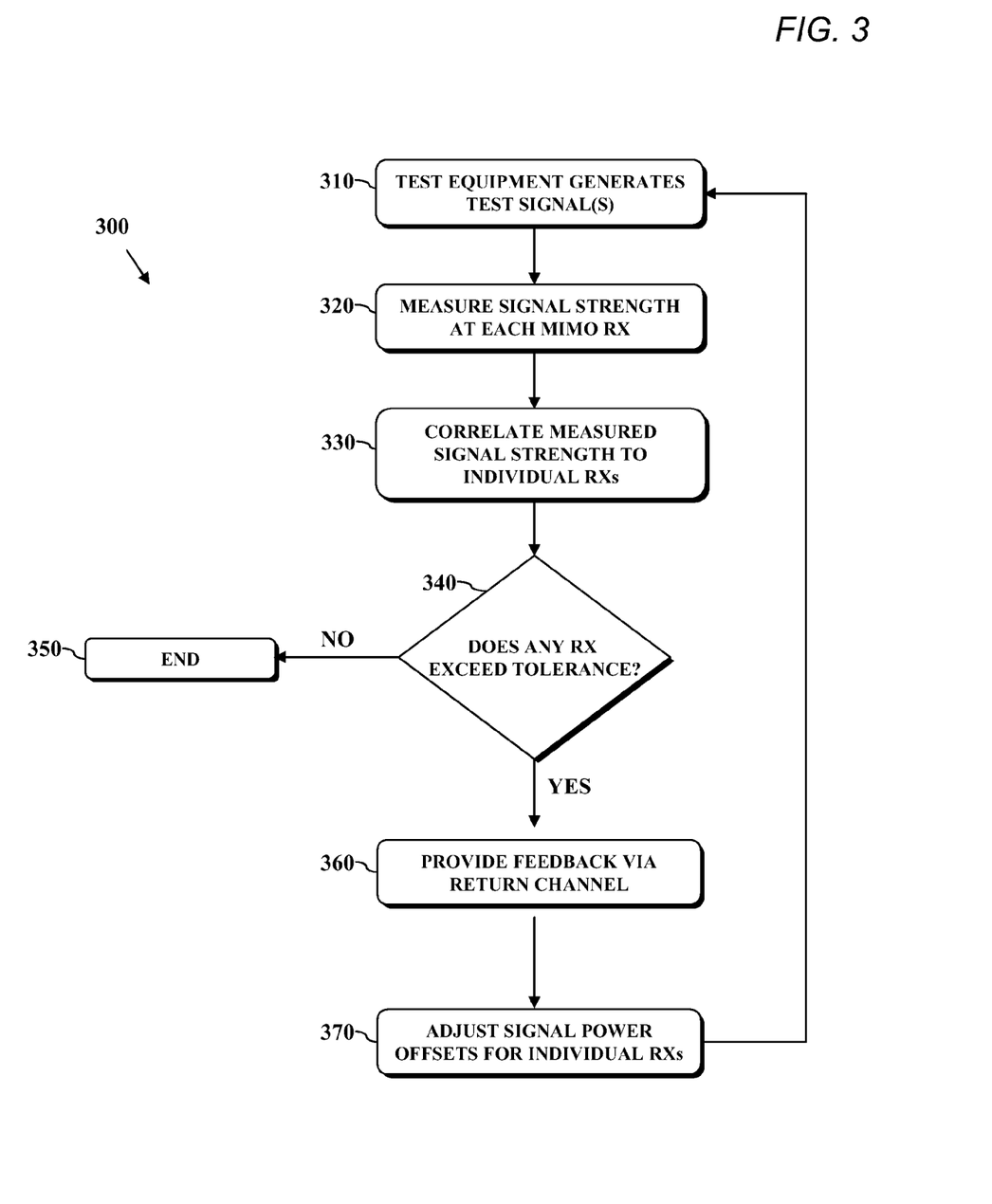
FIG. 3 depicts a process for implementing a MIMO signal calibration process at the factory-level for the receiver-side, in accordance with one embodiment of the invention.

Referring now to FIG. 3, depicted is another embodiment of a process for implementing a MIMO signal calibration scheme in accordance with the principles of the invention. While process 200 of FIG. 2 above relates to a factory calibration process for the transmitter-side of such a MIMO communication system, process 300 is the corollary factory calibration process for the receiver-side of such a MIMO communication system.

As with process 200 above, the test signals generated at block 310 may be provided to the test equipment via either a wired or wireless channel. When transmitted wirelessly, the test signals may be transmitted in a controlled environment so as to minimize ambient interferences and location-specific signal anomalies. However, the test signals may similarly be provided by the test equipment to each of the individual MIMO receivers over one or more wired connections. Such test equipment may comprise any known equipment capable of producing a test signal.

Upon being received, these test signals may then be measured at the receiver-side at block 320. It should be appreciated that any number of known means may be used to measure the signal strength.

Once the signals have been measured, process 300 may continue to block 330 where the individual measured signal strengths may then be correlated to the individual receivers that comprise the receiver-side (e.g., receiver-side 120) of the MIMO system.

Process 300 may then continue to block 340 where a determination may be made as to whether any of the individual receivers indicate a received signal strength that is outside a predetermined tolerance (e.g., ±X dB) from the other receivers. While in one embodiment this tolerance may be set by the manufacturer, it may similarly be based on user preferences or the like.

As with the determination of block 240 in FIG. 2 above, the determination of block 340 may be made using a number of different techniques, including each of the techniques described above with reference to block 240. For brevity, the disclosure accompanying block 240 above will not be repeated here, but it should be appreciated that those same techniques or approaches can apply to the operation of block 340.

Regardless of how the determination at block 340 is performed, if it is determined that no individual receiver is exceeding the predetermined tolerance, process 300 will continue to block 350 where the process may end. If, on the other hand, it is determined that any one or more of the receivers exceed the received signal strength tolerance, then process 300 may continue to block 360 where feedback representative of the received signal strength in question may be provided over a return channel (wired or wireless) to the test equipment. It should also be appreciated that the determination of block 340 may be performed after providing feedback of block 360 to the test equipment. That is, the receiver-side may provide information signal feedback for each of the receivers to the test equipment, and then the test equipment can compare such signal strength information to known values to determine if the predetermined tolerance has been exceeded.

Continuing to refer to FIG. 3, process 300 may then continue to block 370 where the receive parameters may be adjusted up or down for any individual receiver exceeding the tolerance at block 340. In one embodiment, such adjustment may comprise adjusting the VGA offsets of the particular receiver in question. In one embodiment, such calibration may be performed by incrementing up or down the gain by a predetermined amount. Alternatively, the amount of the calibration may be a function of the amount by which the given receiver exceeded the predetermined tolerance. The operations of blocks 310-370 may be repeated until the signal strengths for each of the individual receivers have been normalized (i.e., each exhibit received signal strength within tolerance).

Figure 4:
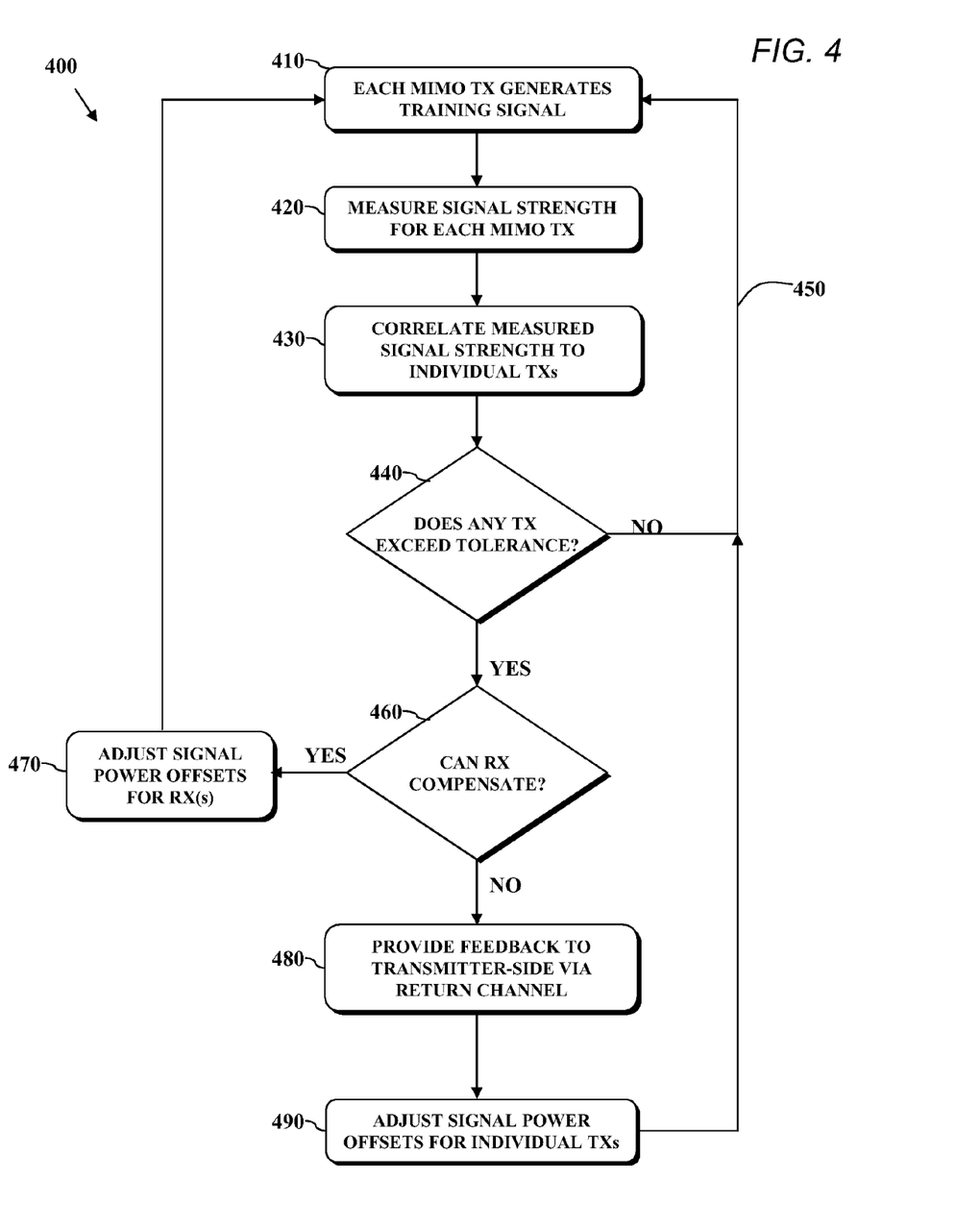
FIG. 4 depicts a process for implementing a MIMO signal calibration scheme during normal operation, in accordance with one embodiment of the invention.

Referring now to FIG. 4, depicted is a process for implementing a MIMO signal power control scheme during normal operation, in accordance with one embodiment of the invention. In particular, process 400 may be implemented in normal operation in an uncontrolled environment, such as would be the case at a user location. Process 400 may preferably be performed on a continuous or periodic basis during operation of the MIMO system.

Process 400 begins at block 410 with each of the MIMO transmitters (e.g., $TX_1$-$TX_n$) transmitting a training signal to the receiver-side. In one embodiment, the training signal may comprise a predefined pattern or sequence that the receiver-side is expecting or would otherwise recognize. It should also be appreciated that the training signals may be transmitted using any previously-stored default signal power offsets that were determined above in accordance with processes 200 and/or 300. These training signals may be generated on a continuous or periodic basis during operation of the MIMO system.

Once received, these training signals may then be measured at block 420 on the receiver-side (e.g., receiver-side 120). It should be appreciated that any number of known means may be used to measure the signal strength. Once the signals have been measured, process 400 may continue to block 430 where the measured signal strengths may be correlated to the individual transmitters that produced them and which comprise the transmitter-side (e.g., transmitter-side 110) of the MIMO system. Alternatively, the individual transmitters may be correlated to their respective signals prior to the measurement operation of block 420.

Process 400 may then continue to block 440 where a determination may be made as to whether any of the individual transmitters on the transmitter-side exhibit a signal strength that is outside a predetermined tolerance (e.g., ±X dB) from the other transmitters. This tolerance may be set by the manufacturer or may be user-defined.

As with the determination of blocks 240 and 340 of FIG. 2 and FIG. 3, respectively, the determination of block 440 may be made using any number of different techniques, including each of the techniques described above with reference to block 240.

Regardless of how the determination at block 440 is performed, if it is determined that no individual transmitter is exceeding the predetermined tolerance, process 400 will follow path 450 and repeat the operations of blocks 410-440 in a continuous or periodic manner. The time increment for repeating blocks 410-440 may be factory-based or user-based.

If, on the other hand, it is determined at block 440 that any one or more of the transmitters exceed the signal strength tolerance, then process 400 may continue to block 460 where an optional receiver compensation operation may be initiated. In particular, this receiver compensation operation may be initiated at block 460 by determining whether the receiver-side is able to compensate for the identified out-of-tolerance signal(s) from block 440. If it is determined that the receiver-side can compensate, process 400 may continue to block 470 where such compensation may be performed. In one embodiment, such compensation may include adjusting the VGAs of one or more of the individual receivers comprising the receiver-side. In one embodiment, such compensation may comprise adjusting (e.g., incrementing up or down) the VGA offsets of one or more of the individual receivers on the receiver-side.

If, on the other hand, it is determined at block 460 that the receiver-side cannot compensate for the identified out-of-tolerance signal(s), or if the optional receiver compensation feature is not performed as part of process 400, then process 400 may then continue to block 480 where the receiver-side (e.g., receiver-side 120) may provide representative feedback over the MIMO system's return channel (e.g., wireless return channel 140). It should also be appreciated that the determination of block 440 may be made on the receiver-side or on the transmitter-side. If made on the transmitter-side, then the feedback operation of block 480 may be performed prior to the determination of block 440.

Continuing to refer to FIG. 4, process 400 may then continue to block 490 where the transmit parameters may be adjusted up or down for any individual transmitter that exceeded the tolerance at block 440. In one embodiment, this adjustment may comprise adjusting the power offsets (e.g., VGA and/or PA offsets) of the particular transmitter in question. In one embodiment, such calibration may be performed by incrementing up or down the signal power gain by a predetermined amount. Alternatively, the amount of the calibration may be a function of the amount by which the given transmitter exceeded the predetermined tolerance. The operations of blocks 410-490 may continue in a continuous or periodic manner while the MIMO system is in operation.

Although not depicted in FIG. 4, in another embodiment a system-level gain control scheme may be employed for the overall transmitter-side rather than (or in addition to) the individual transmitter adjustment process of FIG. 4. This power gain control scheme may include making a determination (e.g., at block 440) as to whether the overall signal strength from the transmitter-side is acceptable (e.g., within a desired range, above a minimum level, etc.). This determination may be based on user preference, the particular communication application, etc.

If it is determined that the overall signal strength is not acceptable, the receiver-side may similarly provide feedback to that effect over the MIMO system's return channel. This feedback may be used on the transmitter-side to control the transmit parameters applicable across all of transmitters. In particular, the transmitter gain for all of the transmitters on the transmitter-side may be adjusted up or down by the same amount so as to provide better system control, easier signal reception and/or easier demuxing of the transmitted streams into the original individual streams.

It should further be appreciated that the MIMO system's wireless return channel (e.g., return channel 140) is comprised of a single transmitter on the receiver-side, and a single receiver on the transmitter-side. As such, the transmitter and receiver that comprise the return channel may similarly be calibrated using process 400.

Figure 5:
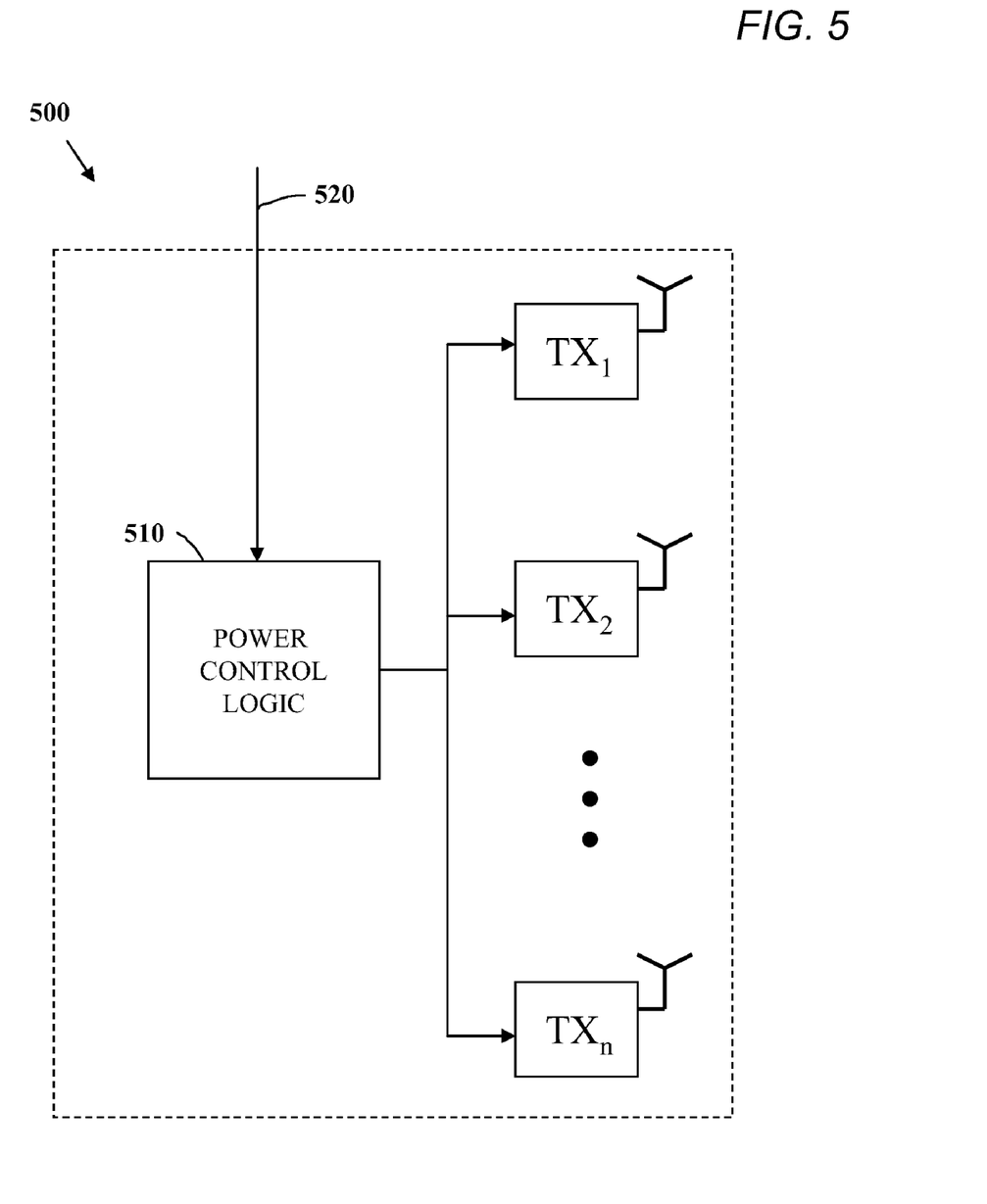
FIG. 5 depicts a block diagram of a MIMO transmitter-side system configured in accordance with one embodiment of the invention.

Referring now to FIG. 5, depicted is an exemplary MIMO transmitter-side system 500 configured in accordance with the principles of the invention. Transmitter-side system 500 includes a plurality of individual antennas and related signal-transmission circuitry (e.g., VGA, PA, etc.), denoted in FIG. 5 as transmitters $TX_1$-$TX_n$. The details of the transmitters' VGAs, PAs and other signal transmission circuitry are generally known in the art.

The transmitter-side system 500 further includes power control logic 510 for controlling/adjusting the VGA and/or PA of each individual transmitter $TX_1$-$TX_n$ based on the feedback from return channel 520 (which may be wired or wireless) and in accordance with processes 200 or 400 of FIG. 2 or 4, respectively. In particular, the power control logic 510 may be used to adjust the signal power offsets, as described in detail above. In another embodiment when, for example, the determination operations of blocks 240 and/or 440 described above are to be performed on the transmitter-side, such operations may similarly be performed by the power control logic 510.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art. Trademarks and copyrights referred to herein are the property of their respective owners.

What is claimed is:

1. A method for providing power control in a multiple-input and multiple-output (MIMO) communication system, the method comprising the acts of:
   measuring a plurality of signal strengths provided by a transmitter-side of the MIMO communication system, wherein the transmitter-side comprises a plurality of individual transmitters;
   correlating the plurality of signal strengths to corresponding transmitters of the plurality of individual transmitters;
   determining if any of the plurality of signal strengths exceeds a predetermined tolerance;
   providing feedback regarding the plurality of signal strengths to the transmitter-side via a return channel;
   adjusting a signal power offset for each of the plurality of individual transmitters corresponding to any of the plurality of signal strengths that exceed the predetermined tolerance; and
   storing a default signal power offset, based on the adjusting the signal power offset, for use during normal operation of the MIMO communication system.

2. A multiple-input and multiple-output (MIMO) communication system comprising:

a transmitter-side including a plurality of individual transmitters adapted to transmit signals having a corresponding plurality of signal strengths; and a receiver-side including a plurality of receivers adapted to receive the signals, wherein the receiver-side is further adapted to:

measure the plurality of signal strengths received from the transmitter-side;

correlate the plurality of signal strengths to corresponding transmitters of the plurality of individual transmitters; and provide feedback regarding the plurality of signal strengths to the transmitter-side via a return channel of the MIMO communication system;

wherein at least one of the transmitter-side and receiver-side is further adapted to:

determine if any of the plurality of signal strengths exceeds a predetermined tolerance; and adjust a signal power offset for each of the plurality of individual transmitters corresponding to any of the plurality of signal strengths that exceed the predetermined tolerance; and wherein a default signal power offset, based on the adjusted signal power offset, is to be used during normal operation of the MIMO communication system.

* * * * *